United States Patent
Baik et al.

[11] Patent Number: 5,938,805
[45] Date of Patent: Aug. 17, 1999

[54] SILICA GLASS MONOLITH FABRICATING METHOD USING SOL-GEL PROCESS

[75] Inventors: Young-Min Baik, Kumi; Young-Sik Yoon, Gumi; Sun-Uk Kim; Myung-Chul Jun, both of Pohang, all of Rep. of Korea

[73] Assignee: SamSung Electronics Co., Ltd., Kyungki-do, Rep. of Korea

[21] Appl. No.: 09/037,521

[22] Filed: Mar. 10, 1998

[30] Foreign Application Priority Data

Mar. 10, 1997 [KR] Rep. of Korea .......................... 97-7973

[51] Int. Cl.[6] .................................................. C03B 19/12
[52] U.S. Cl. .................................. 65/17.2; 65/395; 65/440
[58] Field of Search ........................... 65/17.2, 395, 396, 65/440

[56] References Cited

U.S. PATENT DOCUMENTS

| | | |
|---|---|---|
| 4,419,115 | 12/1983 | Johnson, Jr. et al. ...................... 65/395 |
| 4,605,428 | 8/1986 | Johnson, Jr. et al. ...................... 65/395 |
| 4,624,800 | 11/1986 | Sasaki et al. .............................. 516/81 |
| 4,680,045 | 7/1987 | Osafune et al. ........................... 65/396 |
| 4,680,046 | 7/1987 | Matsuo et al. ............................. 65/395 |
| 4,681,615 | 7/1987 | Toki et al. ................................. 65/396 |
| 4,786,302 | 11/1988 | Osafune et al. ........................... 65/396 |
| 4,902,328 | 2/1990 | Knauff et al. ............................. 65/17.2 |
| 5,250,096 | 10/1993 | Bruce et al. ............................... 65/395 |
| 5,254,508 | 10/1993 | Kirkbir et al. ............................. 65/395 |

*Primary Examiner*—Sean Vincent
*Attorney, Agent, or Firm*—Robert E. Bushnell, Esq.

[57] ABSTRACT

A silica glass monolith fabricating method using a sol-gel process. In the method, a first sol is formed by mixing 100 parts by weight of high-density silica containing powder with 100–300 parts by weight of water, and rapidly dried, while the pH of the first sol is being controlled in the range between 9 and 11. The dried first sol is powdered and then thermally treated at or above 600° C., and a second sol is formed by mixing the thermally-treated powdered first sol with 100–200 parts by weight of deionized water and a aqueous organic binder. The second sol is gelled in a mold, dried, thermally treated, and sintered. Thus, a high-purity silica glass monolith is obtained.

18 Claims, 2 Drawing Sheets

SILICA GLASS MONOLITH FABRICATING METHOD USING SOL-GEL PROCESS

CLAIM OF PRIORITY

This application makes reference to, incorporates the same herein, and claims all benefits accruing under 35 U.S.C. §119 from an application entitled Silica Glass Monolith Fabricating Method Using Sol-Gel Process earlier filed in the Korean Industrial Property Office on Mar. 10, 1997, and there duly assigned Ser. No. 97-7973 by that Office.

BACKGROUND OF THE INVENTION

1. Field of the Invention

The present invention relates to a sol-gel process, and in particular, to a method for fabricating a silica glass monolith containing high-purity and high-density silica, for use in fabricating an optical fiber forming glass.

2. Description of the Related Art

In general, many methods have been suggested to fabricate a glass monolith by a sol-gel process. Example of some sol-gel processes are found in U.S. Pat. No. 4,419,115 to David W. Johnson, et al., entitled Fabrication Of Sintered High-Silica Glasses, discusses a two-step gelling process for the fabrication of sintered high-silica glass wherein fumed silica is mixed with deionized water to form a first gel not in need of pH adjustment. This first gel is then dried, wherein the drying may occur in a humidity controlled environment. The dried first gel is thermally treated to raise the temperature of the dried first gel in the vicinity of 750 to 850 degrees Celsius and then cooled, then the cooled dried first gel is then fragmented, redispersed in deionized water and placed in a closed mold to form a second gel, which is then dried and sintered to form a glass monolith. Also described therein is a pH adjusting step of adding boric acid to the deionized water to decrease the pH which lowers the gelling rate and that a further decrease in pH will increase the gelling rate. U.S. Pat. No. 4,605,428 to David W. Johnson, et al., entitled Sintered High-Silica Glass And Articles Comprising Same discusses some modification of the two-step gelling process for the fabrication of sintered high-silica glass of the U.S. Pat. No. 4,419,115 patent. U.S. Pat. No. 4,624,800 to Yutaka Sasaki, et al., entitled Method For Producing Aqueous, Low-Alkali Metal, Low-Alumina Silica Sols, describes a method for producing an aqueous silica sol by mixing purified water and a silica powder. The pH of the sol is adjusted by addition of an acid and/or a base (ammonia). U.S. Pat. No. 4,680,045 to Haruo Osafune, et al., entitled, Method Of Preparing Tubular Silica Glass, describes a sol-gel method of preparing tubular silica glass using a mixture of silicon alkoxide, water, hydrochloric acid and fumed silica to form a sol, which is gelled, dried and sintered to form the glass. Adjusting the pH of the sol is discussed in col. 4, line 63-col. 5, line 15. U.S. Pat. No. 4,680,046 to Nobutaka Matsuo, et al., entitled, Method Of Preparing Preforms For Optical Fibers, describes a sol-gel process for forming preforms for optical fibers wherein the pH of one sol solution was adjusted by the addition of ammonia water and water. Another sol solution was prepared by including alcohol (anhydrous ethanol); and this sol solution had the pH adjusted by the addition of hydrochloric acid and then readjusted by the addition of ammonia water and water. U.S. Pat. No. 4,681,615 to Motoyuki Toki, et al., entitled, Silica Glass Formation Process, describes a process for forming monolithic silica glass by mixing hydrochloric acid, ethyl-silicate and fumed silica (and in some examples water was added) to form a sol having its pH adjusted by the addition of an ammonia solution. The sol was then gelled in a cubical container, dried and sintered to form the silica glass. U.S. Pat. No. 4,786,302 to Haruo Osafune, et al., entitled, Method Of Preparing Tubular Silica Glass, describes a sol-gel method of preparing tubular silica glass using a mixture of silicon alkoxide, water, hydrochloric acid and fumed silica to form a sol, which is gelled, dried and sintered to form the glass, wherein the pH of the sol is adjusted. U.S. Pat. No. 5,250,096 to Allan J. Bruce, et al., entitled, Sol-Gel Method Of Making Multicomponent Glass, describes forming a first sol using a mixture of Si-alkoxide, alcohol (e.g. ethanol) and one or more metal compounds added to an appropriate liquid (alcohol if the compound is an alkoxide or an aqueous medium if the compound is a soluble salt). The first sol is gelled at 60 degrees Celsius, broken down to a fine powder and dried at a temperature between 60 and 150 degrees Celsius. The powder is redispersed in water, having its pH adjusted by the addition of an acid, to form a second sol, cast in molds of glass tubing and rubber stoppers to gel. The gel is removed from the mold, dried and sintered to form a low alkali silica glass. The addition of ammonia water to raise the pH is also described therein. U.S. Pat. No. 5,254,508 to Fikret Kirkbir, et al., entitled, Sol_Gel Process For Forming A Germania-Doped Silica Glass Rod, describes a sol-gel process for forming germania doped silica class rods utilizing alkoxides, deionized water, ethanol and hydrofluoric acid.

Silica glass obtained by using fumed silica powder only is vulnerable to cracking during a drying step, thus it fails to achieve its general use. In a sol-gel process using silicon alkoxide, a glass body is homogeneous and transparent but has a very high shrinkage rate (i.e, higher than 60%), which makes it difficult to use the glass body for a large secondary glass tube for fabrication of an optical fiber.

In a process using fumed silica particles, wherein a first sol is formed by dispersing the fumed silica particles in water to prevent cracking, gelled, dried, and powdered, and a second sol is formed by thermally treating the silica powder and re-dispersing the thermally treated silica powder in water, gelled, dried, and sintered, so that the thus-obtained powder particles are larger than the original powder particles, the size of pores among the particles is increased, and a crack-free silica glass monolith is obtained. When fabricating a large glass monolith in the above process, even the two sol dispersion steps cannot prevent cracking during the drying steps, and a long time is required to gel the first sol.

SUMMARY OF THE INVENTION

An object of the present invention is to provide a silica glass monolith fabricating method using a sol-gel process, which can remarkably reduce a time required to reach a second sol dispersion step by rapidly drying a first sol without a gelation step through control of the pH of the first sol.

Another object of the present invention is to provide a silica glass monolith fabricating method using a sol-gel process, which can prevent cracking caused by capillary pressure during a drying step by increasing the size of powder particles and thus the size of pores among the particles.

Still another object of the present invention is to provide a silica glass monolith fabricating method using a sol-gel process, which can prevent cracking during a second sol drying step by adding an appropriate amount of aqueous organic compound during the second sol drying step.

To achieve the above objects, there is provided a silica glass monolith fabricating method using a sol-gel process. In the method, a first sol is formed by mixing 100 parts by weight of high-density silica containing powder with 100–300 parts by weight of water, and rapidly dried, while the pH of the first sol is being controlled in the range between 9 and 11. The dried first sol is thermally treated at or above 600° C., and a second sol is formed by mixing the thermally-treated first sol with 100–200 parts by weight of deionized water. The second sol is gelled in a mold, dried, thermally treated, and sintered. Thus, a high-purity silica glass monolith is obtained.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
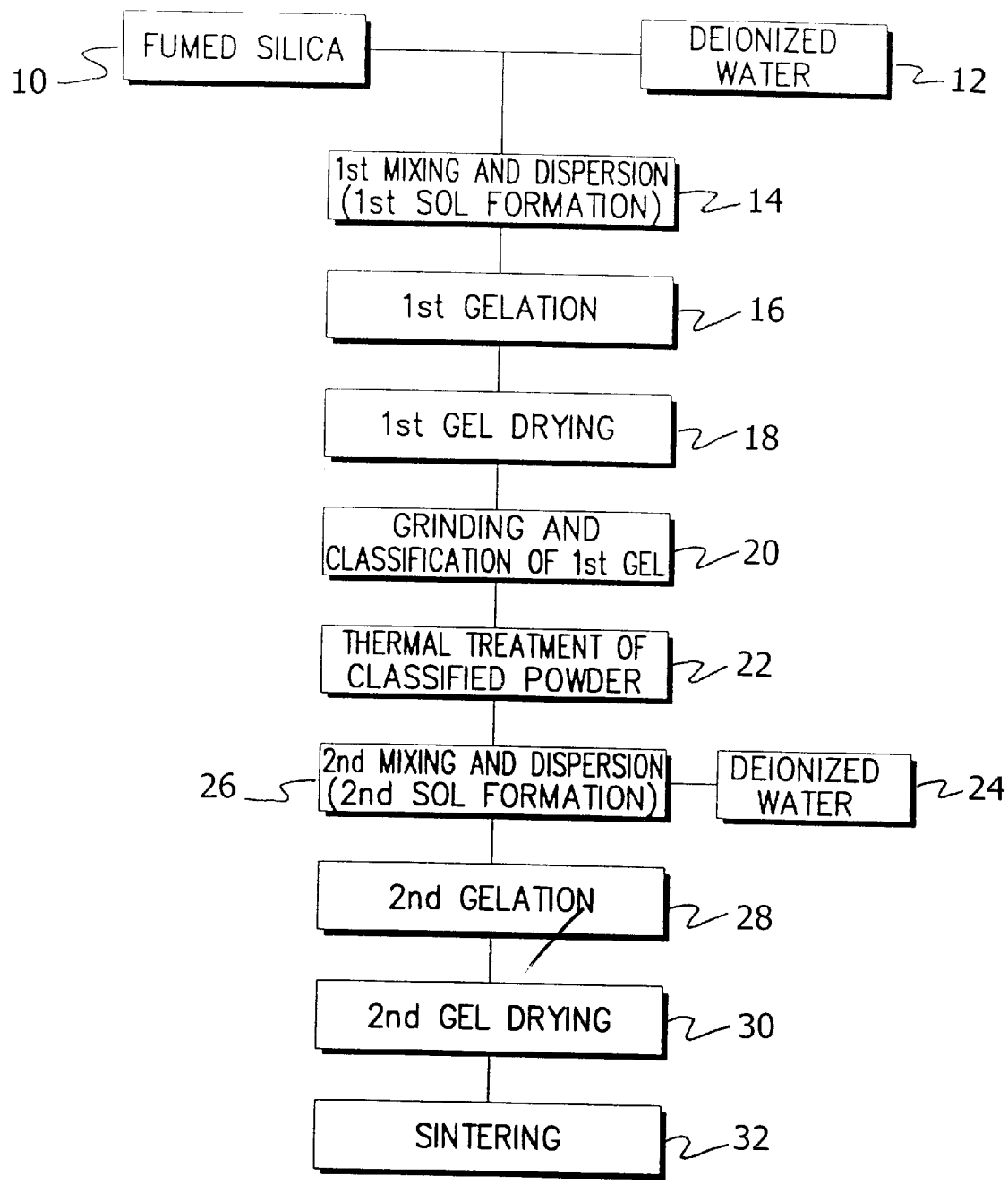
FIG. 1 is a flowchart of a silica glass fabricating method, known to the applicant, using a sol-gel process.

FIG. 1, illustrates a process wherein fumed silica particles (10) and deionized water (12), are mixed to form a first sol (14). The fumed silica particles are dispersed in deionized water to prevent cracking. The first sol is then gelled (16), dried (18), and ground to form a powder (20). The thus-obtained powder particles are larger than the fumed silica particles. The powder is then thermally treated (22) and mixed with deionized water to form a second sol (26). The second sol then gelled (28) in a mold, dried (30), and sintered (32). Due to the powdering of the dried first sol-gel, the size of pores among the particles is increased, and a crack-free silica glass monolith is obtained.

Figure 2:
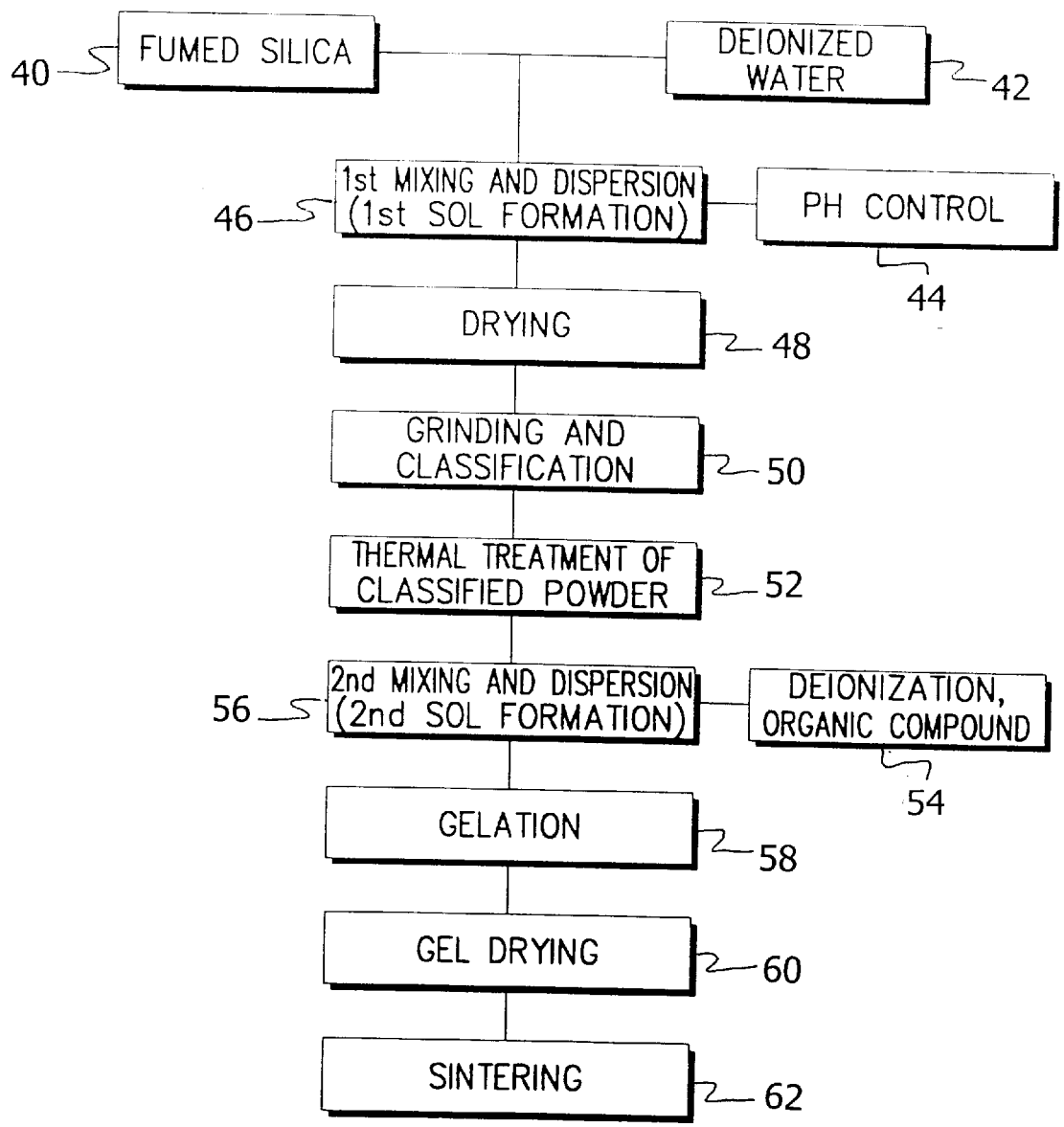
FIG. 2 is a flowchart of a silica glass monolith fabricating method using the sol-gel process according to a preferred embodiment of the present invention.

Referring to FIG. 2, fine particles containing high-density silica (42), preferably fumed silica powder (having a desirable size of 7–40 nm) obtained by reacting silicon tetrachloride with oxygen is mixed with water (42), preferably, deionized water, at a weight ratio of 1:1–1:3 in a high shear mixer, and then a homogeneously mixed first sol (46) is formed by a ball mill, according to a silica glass monolith fabricating method of the present invention. The pH of the first sol is adjusted (44) in the range between 9 and 11 by adding an appropriate amount of ammonia liquid to the first sol, without gelation of the first sol. Then, the first sol is dried (48) at or above 100° C. in an electric oven or rapidly dried in a microwave oven. Particles are grown by coagulation by thermally treating (52) the dried first sol at a temperature of 600–1200° C. The grown particles are re-dispersed (56) in water (54), i.e., deionized water, thereby forming a second sol. During the formation of the second sol, an aqueous organic binder (54) such as polyvinyl alcohol can be added when necessary to prevent possible cracking during a drying step. Subsequently, the second sol becomes a homogeneous mixture by the ball mill and is gelled (58) in a mold which is preferably easily detachable from the gel. It is more preferable to remove bubbles from the mixture before pouring the second sol in the mold by reducing the ambient pressure of the mixture below an atmospheric pressure. After the gelation, the moist gel is removed from the mold and dried (60). At or below 1100° C. in a low-temperature furnace, an OH-group is removed from the dried gel free of cracks using Cl gas, and remaining Cl and the added binder are simultaneously removed therefrom using He gas. Then, the dried gel is sintered (62) and glassified between 1100° C. and a glass fusion point in a high-temperature furnace.

The silica glass monolith fabricating method according to the present invention will be described with reference to an embodiment in a best mode, hereinafter.

A first sol, containing by weight 25% of silica, is formed by mixing 2200 g of fumed silica powder having a specific surface area of 50 $m^2/g$ and containing high-density silica with 6600 g of deionized water and 50 ml of 28% ammonia liquid. To obtain a homogeneous first sol, they are mixed with 18 kg of silica balls having a diameter of 10 mm in a ball mill at 90 rpm for 24 hours. Then, the first sol is dried in a drier at 120° C. for 24 hours, ground, classified in a 20 mesh sieve, and thermally treated at 1100° C. for one hour in a heat treatment furnace having a temperature rising speed of 300° C./hr. The thermally-treated powder is mixed with deionized water at a weight ratio of 1:1.2, blended for 15 minutes, and treated for 24 hours with additional 20 g of polyvinyl alcohol in the ball mill under the same conditions as for the first ball mill treatment. Here, 4.4 g of ammonium fluoride is added to the resulting mixture 20 minutes before the second ball mill treatment is completed. Then, the formed sol is gelled in a mold for 48 hours. The mold is formed of teflon and divided into an upper portion, a lower portion, an outer tube-shaped portion, and a central rod. The dimensions of an object moldable by the mold are an inner diameter of 35 mm, an outer diameter of 71 mm, and a length of 1.3 m. After gelation, the rod is removed from the mold, the gel is dried in the mold for 2–3 days, and the mold is then detached from the gel. The tube-shaped gel is dried at room temperature and at a relative humidity of 80% for 10 days, at 40° C. for 24 hours, at 60° C. for 24 hours, and then at 80° C. for 24 hours. Remaining moisture and organic material are removed from the dried gel at 900° C. for 5 hours in a heat treatment furnace having a temperature rising speed of 100° C./hr. The thermally-treated gel is glassified in a furnace with an atmosphere of He and Cl gases. Here, dehydroxylation and glassification are performed at 600–1000° C. for 5 hours and at 1400° C. for one hour, respectively. The glassified and sintered tube has an inner diameter of 21 mm, an outer diameter of 41 mm, and a length of 1 m, and shows a shrinkage rate of about 25%.

As describe above, the silica glass monolith fabricating method using a sol-gel process according to the present invention reduces a processing time by rapidly drying a first sol without a gelation step and suppresses cracking during a drying step by adding an aqueous organic binder, as compared to the method of FIG. 1.

In addition, the first sol is very rapidly dried without the first gelation step and thus a time required to reach the second sol dispersion step is reduced because the first sol is formed while its pH is being controlled to be alkaline with an additional alkaline material. The first sol is formed from original powder, dried, and thermally treated so that the size of powder particles and thus the size of pores among the particles are increased. As a result, capillary pressure-induced cracking is prevented during the drying step. Furthermore, the pore size and the adhesion force between particles are controlled by adding an appropriate amount of aqueous organic binder during the second gel drying step, thereby preventing possible cracking during the second gel drying step.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A silica glass monolith fabricating method using a sol-gel process, the method comprising the steps of:

forming a first sol by mixing 100 parts by weight of high-density silica with 100–300 parts by weight of deionized water, while controlling the pH of the first sol in the range between 9 and 11;

rapidly drying the first sol in a microwave oven;

grinding and classifying the dried first sol to form a powder;

thermally treating the powder at or above 600° C.;

forming a second sol by mixing 100 parts by weight of the thermally-treated powder with 100–200 parts by weight of deionized water;

pouring the second sol in a mold;

gelling the second sol in said mold to form a gel;

removing the gel from the mold;

drying the gel; and sintering the dried gel to form a high-purity silica glass monolith.

2. The method as set forth in claim 1, wherein said high-density silica comprises a fumed silica powder obtained by reacting silicon tetrachloride with oxygen.

3. The method as set forth in claim 1, wherein the obtained glass monolith is tube-shaped.

4. The method as set forth in claim 2, wherein the obtained glass monolith is tube-shaped.

5. The method as set forth in claim 1, further comprising a step of adding an aqueous organic binder to the second sol to prevent cracking during the drying of said gel.

6. The method as set forth in claim 2, further comprising a step of adding an aqueous organic binder to the second sol to prevent cracking during the drying of said gel.

7. The method as set forth in claim 1, further comprising a step of removing bubbles from the second sol by reducing ambient pressure of the second sol below an atmospheric pressure before pouring the second sol in the mold.

8. The method as set forth in claim 2, further comprising a step of removing bubbles from the second sol by reducing ambient pressure of the second sol below an atmospheric pressure before pouring the second sol in the mold.

9. The method as set forth in claim 5, wherein said aqueous organic binder is comprised of polyvinyl alcohol.

10. The method as set forth in claim 5, wherein said sintering step comprises the steps of:

thermally treating, at a temperature of 1100° C. or less, said dried gel in a low temperature furnace and removing an OH group from said dried gel by utilizing Cl gas;

removing remaining Cl and said aqueous organic binder by utilizing He gas; and glassifying said dried gel in a high temperature furnace.

11. The method as set forth in claim 2, wherein said fumed silica powder has a specific surface area of 50 $m^2/g$.

12. The method as set forth in claim 1, further comprising a step of adding an ammonia liquid to said first sol.

13. A silica glass monolith fabricating method using a sol-gel process, the method comprising the steps of:

forming a first sol by mixing 2200 g of fumed silica powder with 6600 g of deionized water and 50 ml of an ammonia liquid for controlling the pH of the first sol in a range between 9 and 11;

rapidly drying the first sol in a drier at 120° C. for 24 hours;

grinding and classifying, in a 20 mesh sieve, the dried first sol to form a powder;

thermally treating the powder at a temperature between 600° C. and 1100° C.;

forming a second sol by mixing the thermally-treated powder with deionized water at a ratio of 1:1.2;

pouring the second sol in a mold;

gelling the second sol in said mold to form a gel;

removing the gel from the mold;

drying the gel; and sintering the dried gel to form a high-purity silica glass monolith.

14. The method as set forth in claim 13, wherein said second sol undergoes a ball mill treatment in a ball mill during said step of forming a second sol, said ball mill treatment comprising the steps of:

blending the thermally-treated powder and deionixed water for 15 minutes;

adding an aqueous organic binder and treating for 24 hours; and adding 4.4 g of ammonium fluoride 20 minutes before the ball mill treatment is completed.

15. The method as set forth in claim 14, wherein said aqueous organic binder is comprised of polyvinyl alcohol.

16. The method as set forth in claim 13, wherein said mold comprises a central rod and said step of drying said gel comprises:

removing said central rod after gelation; and drying said gel in said mold for 2–3 days to form a tube-shaped gel.

17. The method as set forth in claim 16, further comprising the steps of:

drying the tube-shaped gel at room temperature and at a relative humidity of 80% for 10 days;

drying the tube shaped gel further at a temperature of 40° C. for 24 hours, then at a temperature of 60° C. for 24 hours, and then at a temperature of 80° C. for 24 hours; and removing any remaining moisture by further drying said tube-shaped gel at 900° C. for 5 hours.

18. The method as set forth in claim 13, wherein said sintering step comprises:

heating said dried gel in a furnace having an atmosphere of He and Cl gases to perform dehydroxylation at a temperature between 600–1000° C. for 5 hours and to perform glassification at 1400° C. for one hour.

* * * * *